Sept. 16, 1969   F. ACHELPOHL   3,466,980
PROCESS AND APPARATUS FOR MANUFACTURING CROSSED-BOTTOM
SACKS FROM PLASTICS MATERIAL SHEETING
Filed Aug. 26, 1966   4 Sheets-Sheet 3

INVENTOR
FRITZ ACHELPOHL
BY *Stevens, Davis, Miller & Mosher*
ATTORNEYS

Sept. 16, 1969  F. ACHELPOHL  3,466,980
PROCESS AND APPARATUS FOR MANUFACTURING CROSSED-BOTTOM
SACKS FROM PLASTICS MATERIAL SHEETING
Filed Aug. 26, 1966  4 Sheets-Sheet 4

INVENTOR
FRITZ ACHELPOHL
BY
Stevens, Davis, Miller & Mosher
ATTORNEYS

United States Patent Office 3,466,980
Patented Sept. 16, 1969

3,466,980
PROCESS AND APPARATUS FOR MANUFACTURING CROSSED-BOTTOM SACKS FROM PLASTICS MATERIAL SHEETING
Fritz Achelpohl, Lengerich, Westphalia, Germany, assignor to Windmoller & Holscher
Filed Aug. 26, 1966, Ser. No. 575,408
Claims priority, application Germany, Feb. 9, 1966, W 40,903
Int. Cl. B31b 1/26, 1/76
U.S. Cl. 93—8                                22 Claims

ABSTRACT OF THE DISCLOSURE

This invention relates to a process of manufacturing crossed-bottom sacks from plastics material sheeting and the construction of a station for unfolding a crossed bottom in a bottom-making machine for carrying out the process according to the invention.

BACKGROUND OF THE INVENTION

The German patent specification No. 619,167 discloses in a transversely conveying bottom-laying machine a station for unfolding the crossed bottoms of paper sacks. This station enables a fairly accurate unfolding of the crossed bottoms and a substantially satisfactory design of the resulting crossed bottoms. This object is accomplished in the known apparatus by a folding plate, which is moved against the top layer of the previously opened end of the tube section at right angles to a folding bar, which lies on the end of each tube section to be unfolded and determines the median break of the bottom, said plate being designed to pull the top ply inwardly over the outer edge of the folding bar. During this operation, the tube section is at a standstill so that the top ply of the tube can be folded about the outer edge of the folding bar throughout the extent of said top ply between the corner tucks which are formed when the bottom is being unfolded. This folding of the top ply is effected at the same time as and in one operation with the formation of the corner tucks and results in the formation of the median break of the bottom. This process results also in the formation of accurately corner tucks, which are also essential for a satisfactory formation of the crossed bottom, which is subsequently folded. The corner tucks remain unchanged when the sack blanks are advanced further in the known machine because the blanks consist of paper, which has a relatively low elasticity and flexibility so that any folds which have been formed will be preserved. Plastics material sheeting has a much higher elasticity and flexibility than paper so that the use of the known apparatus with plastics material sheeting would involve an immediate raising of the corner tucks when the folding plate is retracted and the result of the unfolding operation would thus be substantially eliminated. For this reason, the apparatus disclosed in the German patent specification No. 619,167 is not suitable for the manufacture of crossed-bottom sacks from plastics material. Another important disadvantage of the known apparatus resides in that the blank is at a standstill when the bottom is being unfolded so that the blanks must be intermittently advanced in the machine. This results in a small output of such unfolding station, which is inadequate for this reason in view of requirements as to the economic efficiency of modern sack-making machines.

The German patent specification No. 803,627 discloses a continuously operating unfolding apparatus for crossed bottoms of paper sacks. In this known apparatus, that end portion of the tube section which is to be unfolded is raised to a perpendicular position. Spreading fingers are then inserted into this upright perpendicular end portion and perform a spreading motion to unfold the crossed bottom and at the same time impart a horizontal orientation to said bottom. During this operation, the tube section is advanced by grippers, which are moved by a chain. The front corner tuck of the tube section is then moved under a revolving conveyor belt whereas the rear corner tuck is still held by rotating rods and is subsequently moved also under the conveyor belt. While being conveyed by the conveyor belt, the corner tucks are subjected to a preliminary rolling by cooperating rolls.

This known apparatus is also unsatisfactory for the manufacture of crossed-bottom sacks from plastics material sheeting because that end portion of the tube section which is formed into the crossed bottom is not constantly guided, retained and held taut during the formation of the corner tucks so that the high flexibility of the plastics material sheeting may give rise to distortions, which need not be expected in handling paper, which is stiffer. Besides, the initial rolling of blanks made of plastics material sheeting by the cooperating rolls at the exit of the unfolding station would not give the desired result because the folds, even if they had been properly formed, would spring open immediately behind the rolls owing to the above-mentioned elasticity and flexibility of the material.

Similar remarks are applicable to another previously disclosed, continuously operating unfolding apparatus for crossed-bottoms of paper sacks. This apparatus is disclosed in the German patent specification No. 714,028 and comprises spreading fingers, which extend into the horizontally oriented end of the tube section at its horizontally retained end portion which is to be unfolded. As the movement of the tube is being continued, these fingers spread the two plies of the tube apart and turn them through 90° so that they assume a perpendicular orientation. In this case the rear corner tuck cannot be properly formed because the upright ply is not retained and collapses so that the corner tuck is skewed. The unfolded end portions pass between pressure rolls, which serve to fix the previously formed folds. Even if the rear corner tuck had been properly formed, such fixation could not be effected with plastics material sheeting, for the reasons which have been mentioned hereinbefore.

SUMMARY OF THE INVENTION

It is an objct of the invention to provide a process and a station for unfolding a crossed bottom in such a manner that crossed bottoms of sacks of plastics material can be unfolded exactly and in continuous operation so as to enable the manufacture of satisfactory crossed-bottom sacks from plastics material sheeting.

This object is accomplished according to the invention in a process which is characterized in that tube sections are continuously conveyed transversely to their length, each end portion of said tube sections which is to be unfolded is bent at right angles to the plane of the tube section, that ply of said end portion which leads in the bending direction is retained in its perpendicular position by engaging said ply closely beside the hypotenuses about which the corner tucks will be folded, the other ply is separated from said leading ply and turned through 180° whereby corner tucks are formed, said other ply is tightened by engaging the inside of said corner tucks, the corner tucks are joined to the side flaps of the bottom while said other ply is held taut, and said side flaps are then backfolded in known manner and joined to each other and to the outside surfaces of the corner tucks. As the corner tucks are held taut while they are being joined to the side flaps of the bottom, the folds will not be opened when the two unfolded plies are released. In this way, the side flaps can be back-folded and subsequently joined to each other and to the corner tucks while the folds which have been formed by the unfolding operation are preserved.

An apparatus for carrying out the process according to the invention may be characterized according to the invention by the following features:

(a) Continuously revolving conveyor means for conveying the tube sections through the unfolding station, (b) A bending plate or the like, which is provided at the receiving end of the unfolding station and serves to bend through 90° those end portions of the tube sections which are to be unfolded, (c) A retaining device for retaining that ply of the tube which leads in the bending direction, (d) A pull-off device for pulling off the other ply of the tube, (e) Revolving sliders, which are adapted to be inserted into the opened ends of the tube sections and provided with oblique edges, which are intended for engaging the fold lines of the corner tucks from the inside, (f) A welding device for welding the corner tucks to the side flaps, (g) A station for backfolding the side flaps and for securing them to each other and to the corner tucks.

In the apparatus which is designed according to the invention, the two corner tucks of each unfolded end portion of a tube section are exactly aligned under direct control by the respective slider and are thus exactly shaped into a right-angled, isosceles triangle, and are held in the resulting form until they are fixed by spot-welding or the like. These tucks are constantly under control. This exact formation of the corner tucks is essential for the subsequent formation of satisfactory crossed bottoms.

In a further development of the invention, the retaining device for retaining that ply of the tube which leads in the bending direction may consist of a vacuum box, known per se, and a vacuum conveyor belt which is moved over said vacuum box. According to the invention, the vacuum box is divided into at least two compartments and a common vacuum pump is provided for all compartments of the vacuum box. Vacuum conduits provided with separately controlled shut-off valves extend from said vacuum pump to the various compartments of the vacuum box. As a result, two or more sack blanks can normally be moved simultaneously past the vacuum box and, in the case of an error in feeding a sack blank, that compartment of the vacuum box which would be traversed by such blank can be disconnected from the vacuum source. Otherwise, fresh air would be sucked into that compartment whereby the vacuum throughout the vacuum box would be eliminated. The respective plies of other tube section ends which are adjacent to the vacuum box could not be held in their perpendicular position if the vacuum were eliminated.

In order to ensure in the case of such an error in feeding a tube section that the vacuum action on the preceding or succeeding tube section will not be interrupted, the rows of vacuum openings in the vacuum conveyor belt cooperate with vacuum slots of the vacuum box and are spaced apart by a distance which is at least as large as the length of a vacuum slot in the vacuum box. As a result, the trailing vacuum opening of the belt, e.g., in a row of vacuum openings intended to hold a blank, will have left the respective vacuum slot of the vacuum box before the leading opening of the succeeding row, which is not covered by a sack blank owing to the feeding error, reaches this vacuum slot. As a result, an interruption of the vacuum action on the preceding blank need not be feared.

According to a preferred feature of the invention, the length of a row of vacuum openings in the vacuum conveyor belt is at most as large as the width of the narrowest tube section to be handled in the apparatus. This ensures that even with the narrowest tube sections all vacuum openings of one row will be covered by the upright ply of the tube section end portion and the vacuum in the vacuum box can become effective. This would not be the case if air could be induced through one or more holes without obstruction.

According to the invention, revolving grippers may be provided, which reliably retain the top edge of the leading ply of the opened tube section end portion, considered in the bending direction, while the corner tucks are being formed by the sliders and while the subsequent welding operation is being effected. These grippers may succeed the vacuum conveyor belt which has been described hereinbefore and in this case the ply which remains in its perpendicular position is engaged by said grippers after the tube section end has been opened. The grippers might alternatively replace the vacuum conveyor belt and the vacuum source if that ply of the tube section which is to be pulled off is provided with indentations which have the same spacing as the grippers and through which the movable part of the grippers can extend to engage only that ply which is to be retained.

The device for pulling off one ply from the other ply, which is retained in position, may comprise according to the invention a vacuum beam, which performs one revolution per cycle of the machine and is moved parallel to the direction of travel of the sack blanks. To allow for that component of motion of the ply to be pulled off which is directed away from the retained ply of the tube section end portion during the unfolding operation, the orbit of the vacuum beam is inclined from the horizontal so that there is a full surface contact betwen the vacuum face of the vacuum beam and the pulled-off ply for a time which is sufficient to ensure a satisfactory preliminary opening of the end of the tube section. In spite of this inclination of the vacuum beam relative to its direction of travel due to the inclination of its orbit, the vacuum ports of the vacuum beam should act on that ply of the tube section end portion which is to be pulled off along a line which is parallel to the top edge of said ply. For this purpose, the vacuum ports may be arranged in a row which has relative to the vacuum beam an inclination that is equal and opposite to the inclination of the vacuum beam relative to the horizontal. To maintain a linear velocity which is the same as that of the respective sack blank, the velocity of the vacuum beam can be periodically changed during its revolution. For this purpose, a transmission may be used which has a cyclically changing ratio, e.g., a transmission having elliptic gears.

When one ply of the tube section end portion has been pulled from the other ply, which is retained in position, the end portion of the tube section can be further unfolded by means of a blowing tube, which is at right angles to the plane in which the tube section is conveyed and which directs an air stream into the preopened end portion of the tube section. An opening rod may also be provided, which wipes downwardly the ply that has been pulled from the retained ply. This will be particularly suitable in the processing of a relatively thick and relatively heavy plastics material sheeting.

According to the invention, the two grippers of each pair which grip the upper edge of the retained ply of the tube section end portion can be held in their closed position by the pressure of a spring, whereas the pair can be opened as a result of a rolling movement of a roller carried by the movable part of each gripper on an upgrade portion of a cam rail so that the movable gripper part is forced outwardly against the spring pressure. Advantageously, one gripper of each pair of grippers may be secured to one chain and the other gripper to another chain, which chains are common to all pairs of grippers. This arrangement enables a simple adjustment of the distance between the two grippers of each pair in adaptation to tube sections of different widths, because the two chains which carry the grippers can be displaced relative to each other.

According to the invention, the sliders for forming the corner tucks may be moved along a path which is inclined relative to the horizontal. This enables a vertical movement of said sliders into the opened ends of the tube sections during the movement of the latter. The guide track may be formed by a guide rail, on which the sliders are guided by a roller rolling on the rail. Alternatively, the guide rails for the carriages which carry the sliders may be inclined from the horizontal. In this case, simultaneously acting welding devices for all four corner tucks are required.

To ensure a most exact guidance of each slider carriage, the carriages may be guided in a horizontal and vertical directions by rollers engaging a guide rail.

In a development of the invention, the leading spreading arm of each slider may be shorter than the trailing spreading arm. In this arrangement, the leading spreading arm cannot engage and damage that ply of the tube section end portion which is held in a perpendicular position while the slider is being sung into the opened tube section end portion. Besides, those ends of the spreading arms which enter the corner tucks and are provided with the oblique edges which cooperate with the fold lines of the corner tucks may be resilienlty mounted so that they are pivotably moved in an upward direction under pressure and the slider can slide downwardly out of the unfolded crossed bottom. It is also advantageous to provide an easily releasable connection between the spreading member and the guide rail for the slider so that the spreading member can be replaced by a spreading member of different length when sacks having a different size are to be made.

The invention will be described more in detail hereinafter with reference to the accompanying drawing, which shows several embodiments of an unfolding apparatus according to the invention in a bottom-forming machine and details thereof.

Figure 1:
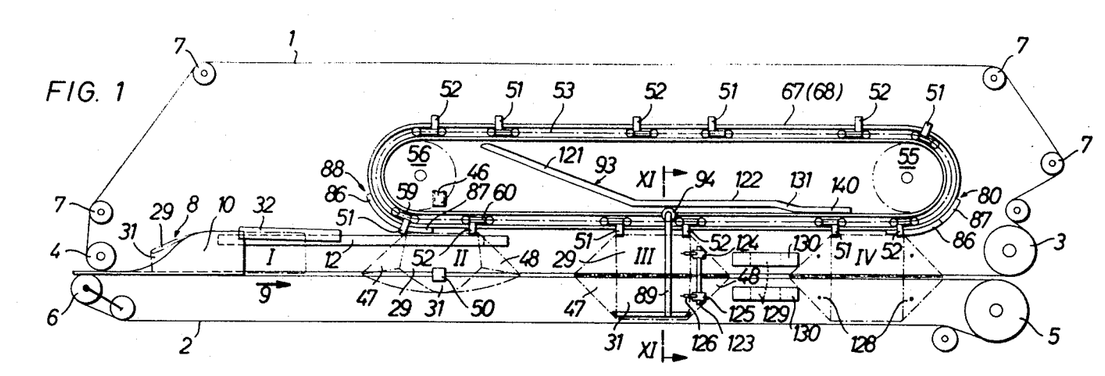
FIG. 1 is a diagrammatic side elevation of the unfolding device according to the invention for forming a crossed bottom.
Figure 9:
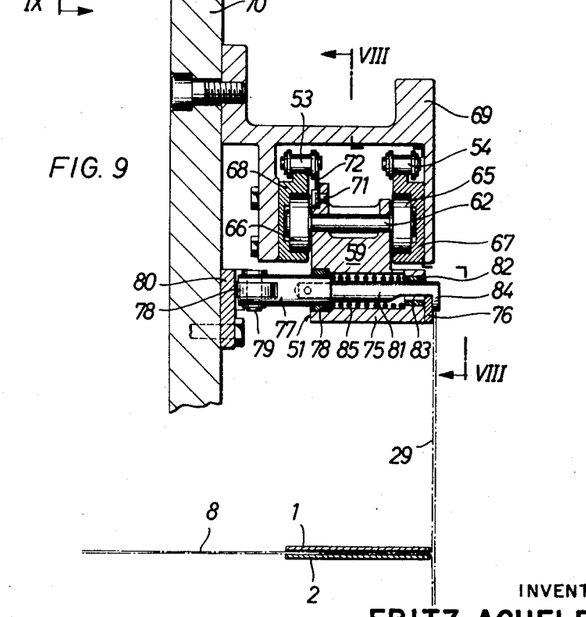
FIG. 9 is a sectional view taken on line IX—IX in FIG. 2.

Continuously revolving conveyor belts 1 and 2 extend around reversing pulleys 3, 4 and 5, 6, the reversing pulleys 3 and 5 being driven by means which are not shown. The conveyor belts are further guided by a number of guide rollers 7. Tube sections 8 of plastics material, which are shown in different processing positions in dash-dot lines, are conveyed transversely to their longitudinal axis between said conveyor belts through the unfolding apparatus in the direction of the arrow 9 without standstills. The conveyor belts 1 and 2 are shown in FIGS. 1 and 9 and are omitted in FIGS. 2 and 3 for the sake of clarity.

A plate 10 is provided at the receiving end of the apparatus and serves for positioning at right angles that end portion of each tube section 8 which is to be unfolded in the formation of a crossed bottom. The direction of the plate 10 gradually changes from the horizontal to the vertical so that the tube section end portion which is guided over the plate 10 is positioned at right angles.

Figures 4, 5:
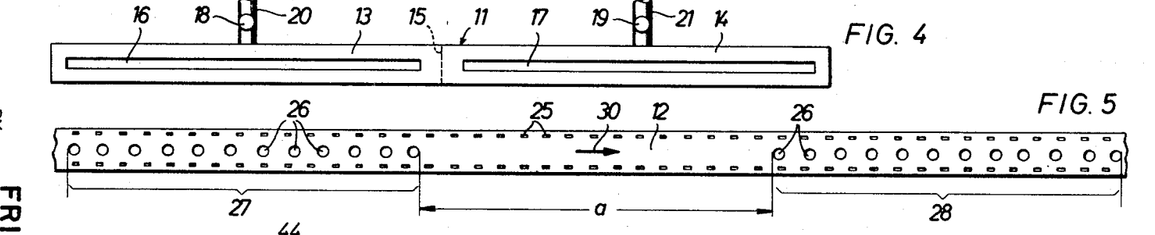
FIG. 4 is a front elevation showing the vacuum box on a larger scale than in FIGS. 1 to 3.
FIG. 5 is a top plan view showing the vacuum conveyor belt on a larger scale than in FIGS. 1 and 2.

The perpendicular end portion of the tube section 8 is then moved into the range of a vacuum box 11. A vacuum conveyor belt 12 moves over that face of the vacuum box which faces the end portion of the tube section (see also (FIGS. 4 and 5). A partition 15 divides the vacuum box 11 into two compartments 13 and 14. On the side facing the vacuum conveyor belt, these compartments have slots 16 and 17, which extend substantially throughout the length of a vacuum box compartment 13 or 14. The length of the slots 16, 17 corresponds to the center distance between the tube sections less the smallest width of the tubes. The two vacuum box compartments 13 and 14 are connected to a vacuum pump, not shown, by conduits 20 and 21, which are separately controlled, e.g., by means of solenoid valves 18 and 19, respectively. The vacuum pump establishes a vacuum in the vacuum box 11 when the vacuum slots 16 and 17 are covered by the vacuum conveyor belt 12 and by the tube section end portion which is moved over them by the conveyor belts 1 and 2 and the vacuum conveyor belt 12.

The vacuum conveyor belt 12 is moved continuously in the same direction and at the same speed as the conveyor belts 1 and 2. The belt 12 moves around reversing pulleys 22 and 23 (FIG. 2), the pulley 22 being driven by means which are not shown. A tensioning roller 24 is provided to apply to the vacuum conveyor belt 12 the tension which is required to maintain the revolving vacuum conveyor belt in sliding contact with that face of the vacuum box 1 which is provided with the vacuum slots 16 and 17. The reversing pulleys 22 and 23 are set at their peripheries with pins, not shown, which enter perforations 25 in the vacuum conveyor belt 12 so that a drive is transmitted (FIG. 5). The vacuum conveyor belt 12 is formed with vacuum openings 26, which cooperate with the vacuum slots 16 and 17 of the vacuum box 11. Of a multiplicity of rows of vacuum openings 26, two such rows 27 and 28 are shown in FIG. 5. The length of said rows does not exceed the width of the narrowest tube section which can be processed in the apparatus. The spacing $a$ between the rows is at least as large as the length of a vacuum slot 16 or 17 of the vacuum box 11. The reason for the two last-mentioned relations will become apparent from the following description of the cooperation of the vacuum box 11 and the vacuum conveyor belt 12.

As has already been mentioned, the end portion of the tube section 8 is moved into the range of the vacuum box 11 and of the continuously revolving vacuum conveyor belt 12 when this end portion has been placed into a perpendicular position, which is indicated at I in FIG. 1. The perpendicular tube section end is centered on a row of vacuum openings 26 and covers the same. As the movement of the tube section is continued, the vacuum in the vacuum box 11 causes ply 29 of the tube section end portion which faces the vacuum conveyor belt 12 to be sucked against the vacuum conveyor belt when the openings 26 of said belt move over the vacuum slots 16 and 17 of the vacuum box 11. In this way, said ply 29 is held in its perpendicular position. As the length of a row of vacuum openings 26 does not exceed the width of the narrowest tube sections 8 to be handled, all vacuum openings of a row, such as 27 or 28, will be covered by the ply 29 even of the narrowest tube section so that the vacuum in the vacuum box 11 can always be effective.

Figure 2:
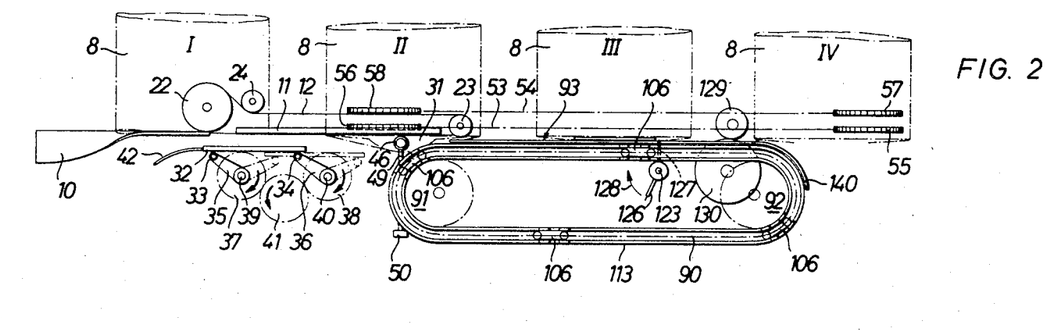
FIG. 2 is a top plan view of the device of FIG. 1.

The tube sections 8 are conveyed through the unfolding apparatus in such a sequence that two tube sections 8 are normally moved past the vacuum box 11 at the same time. This is indicated in FIGS. 1 and 2. If a tube section is missing in the normal sequence of tube sections, e.g., owing to a feeding error, that compartment of the vacuum box 11 which would be traversed by such tube section if it were present must be disconnected from the vacuum source. As a common vacuum pump is provided for both compartments 13 and 14 of the vacuum box, fresh air would otherwise be sucked through the openings 26 of the vacuum conveyor belt 12 and the vacuum throughout the vacuum box 11 would be removed. In this case, the ply 29 of the tube sections which succeed and precede the gap which is due to the missing tube section could not be held in its perpendicular position.

As the distance $a$ between two succeeding rows of vacuum openings 26 in the vacuum conveyor belt is at least as large as the length of a vacuum slot 16 or 17 in the vacuum box, the trailing vacuum opening 26 of the row 28, which is assumed to be covered by a tube section and moves in the direction of the arrow 30 in FIG. 5, has already left the vacuum slot 16 of the vacuum box compartment 13 before the leading vacuum opening 26 of the row 27, which is not covered by a tube section end portion owing to a feeding error, reaches the vacuum slot 16. In such case the vacuum box compartment 13 may be disconnected from the vacuum source by the solenoid valve 18, e.g., under control of photoelectric sensing elements not shown in the drawing, before the leading vacuum opening of row 27 has reached the vacuum slot 16 so that the action of vacuum on the ply 29 of the preceding tube section and the retaining of said ply in its perpendicular position will not be interrupted. This tube section and the row 28 of vacuum openings 26 which apply vacuum to its ply 29 will be entirely in the range of the vacuum box compartment 14 when the leading vacuum opening of row 27 has reached the vacuum slot 16. Similarly, the vacuum box compartment 14 will be rendered inoperative by the solenoid valve 19 shortly before the leading vacuum opening 26 of row 27, which is not covered by a tube section owing to the feeding error, reaches the vacuum slot 17. At this time, the trailing vacuum opening of row 28, which is covered by a tube section end portion, has just left the vacuum slot 17.

The vacuum box compartment 13 is rendered operative shortly before the leading vacuum opening of the row which succeeds the row 27 that is not covered by a tube section end portion has reached the vacuum slot 16, provided that such succeeding row is covered by a tube section end. At this time, the trailing vacuum opening of the uncovered row 27 has left the vacuum slot 16 so that the vacuum may be applied to the vacuum box compartment 13. At this time, the uncovered row 27 of vacuum openings 26 is moving over the vacuum box compartment 14 and this compartment 14 is not rendered operative until the trailing vacuum opening 26 of row 27 has left the vacuum slot 17 and the leading vacuum opening 26 of the row which succeeds the row 27 has reached the vacuum slot 17.

If the two vacuum box compartments 13 and 14 are connected by their conduits 20 and 21 to separate vacuum pumps, a vacuum box compartment need not be rendered inoperative in the case of a feeding error because the vacuum will then be eliminated only in one vacuum box compartment at a time. For the reasons stated above, it is also required in this case that the length of a row of vacuum openings in the vacuum conveyor belt does not exceed the width of the narrowest tube to be handled in the apparatus. The distance $a$ provided according to the invention between two rows of vacuum openings 26 is also essential so that a row of vacuum openings which are not covered by a tube section end portion will not reach, e.g., the vacuum slot 16 when the preceding row, which is covered by a tube section end portion, has already left the vacuum slot 16 because otherwise the vacuum in the vacuum box compartment 13 would be eliminated while a tube section end portion must still be moved past said compartment.

While a tube section 8 is moved through the device 11, 12, which retains the ply 29 of the tube section in its perpendicular position, the tube section end portion is opened in that its ply 31 is pulled from ply 29. This is effected by means of a vacuum beam 32, which performs on revolution per machine cycle and which is pivoted by two pins 33 and 34 to levers 35 and 36. These levers are nonrotatably connected to gears 37 and 38 by bolts 39 and 40. The gears 37 and 38 mesh with a further gear 41, which is rotatable in the direction of the arrow and transmits a drive to the gears 37 and 38. This arrangement serves to move the revolving vacuum beam 32 parallel to the direction of travel of the tube sections 8 (arrow 9 in FIG. 1). To ensure a movement of the vacuum beam 32 at the same linear speed as the tube section 8 to be acted upon by said beam, the gear 41 is driven, e.g., by a transmission having elliptical gears, not shown, so that the speed of the vacuum beam 32 varies periodically in accordance with the speed of the tube sections 8.

Figure 6:
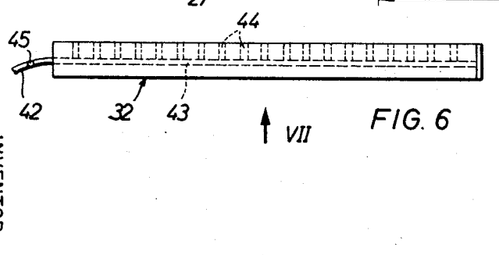
FIG. 6 is a top plan view showing the vacuum beam on a larger scale than in FIGS. 1 to 3.

The vacuum beam 32 is connected by a conduit 42 (FIGS. 6 and 7) to a vacuum pump, not shown. A longitudinal bore 43 of the vacuum beam and transverse bores 44 branching from said bore 43 and opening on that face of the vacuum beam which faces the ply 31 of each tube section end portion serve to apply a vacuum from the vacuum pump to the vacuum beam 32 when the bores 44 are covered by the ply 31 of the perpendicular tube section end portion.

As has already been mentioned, the vacuum beam 32 performs the revolution per machine cycle in such a manner that its face provided with the vacuum bores 44 contacts the ply 31 opposite to a row of vacuum openings 26 of the vacuum conveyor belt 12 whereby the ply 29 of the tube section end is sucked. The ply 31 then covers the vacuum bores 44 so that the vacuum in the vacuum beam 32 becomes effective and ply 31 is sucked against said beam. In the position shown in FIG. 2, the vacuum beam 32 does not yet engage the tube section. As the beam continues its revolution, it contacts the ply 31 when the ply 29 fully covers a row of vacuum openings 26 and said row is throughout its length adjacent to the vacuum slot 16 of vacuum box 11. This position of the vacuum beam 32 is shown in FIG. 7.

Figure 7:
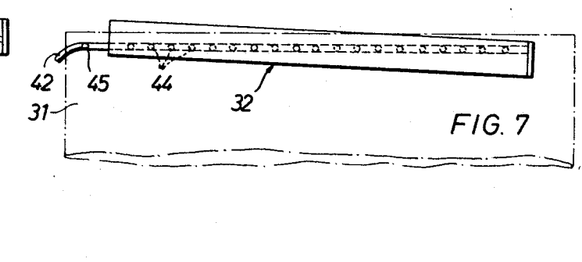
FIG. 7 is an elevation showing the vacuum beam as viewed in the direction of the arrow VII in FIG. 6.

FIG. 7 shows also that the vacuum beam 32 is inclined relative to the horizontal by a corresponding inclination of gears 37, 38 and 41. As a result, the orbit of the vacuum beam 32 is also inclined from the horizontal. The inclination of the vacuum beam and of its orbit ensures that the vacuum beam 32 follows the downwardly moving ply 31 as the beam continues its movement and pulls the ply 31 from the ply 29 of the tube section end portion. As a result, the vacuum bores 44 of the vacuum beam 32 can remain in contact with the pulled-off ply 31 for a time which is sufficient for a satisfactory preliminary opening of the tube section end portion.

As is also apparent from FIG. 7, the vacuum bores 44 are arranged in the vacuum beam 32 in a row which has relative to the longitudinal center plane of the vacuum beam such an inclination opposite to the inclination of the beam that all vacuum bores 44 act on the ply 31 along a line which is parallel to the top edge of said ply. This ensures that the ply 31 will be pulled by vacuum from the ply 29 in a uniform manner during the revolving movement of the vacuum beam 32.

After a sufficient preliminary opening of the tube section end portion by the vacuum beam 32, the latter is rendered inoperative by a solenoid valve 45, which is incorporated in conduit 42. This action serves to avoid an excessive pull on the ply 31 when the revolving vacuum beam 32 moves further away from the path along which the tube sections are conveyed. The vacuum beam 32 will not be rendered operative again until it engages the next succeeding tube section end portion. Shortly after the vacuum beam 32 has been rendered inoperative, it will assume the position indicated in dash-dot lines in FIG. 2. At this time, the tube section 8 is in position II.

Before reaching position II, the ply 31 descends further by gravity. For a complete opening of the tube section end portion, this descent is continued to a larger extent by the action of an air jet, which is directed from a pipe 46 into the preopened tube section end against the downwardly inclined ply 31 (FIG. 2) in position II of the tube section. The pipe 46 is connected to a compressed-air source by means which are not shown. With very light plastics material sheeting, the air jet emitted by the pipe 46 will be sufficient for a descent of the ply 31 into a substantially perpendicular, depending position and for a preforming of corner tucks 47 and 48. With heavier and stiffer sheeting, it may be necessary for this purpose to provide also an opening rod 49, which is pivoted at 50 and is pivotally moved at right angles to the direction of travel of tube sections 8. By this pivotal movement the rod 49 wipes the ply 31 downwardly.

When the ply 29 is still sucked by the vacuum conveyor belt 12 and is thus retained in its perpendicular position, the top edge of the ply 29 is engaged by a pair of grippers 51 and 52, which thereafter retain the ply 29 in its perpendicular position during the following processing operations.

The illustrative embodiment shown in FIG. 1 comprises six pairs of grippers 51, 52. These grippers are carried by continuously revolving chains 53 and 54 and are spaced apart in accordance with the spacing of the tube sections 8 in the apparatus. The chains 53 and 54 extend around sprockets 55, 56 and 57, 58 and move at the same speed as the tube sections 8. Each gripper 51, 52 constitutes a part of a carriage 59 or 60 (see also FIGS. 8 and 9). These carriages are guided by guide rails 67 and 68 with the aid of four rollers 63 to 66, which are rotatably mounted on axles 61 and 62. The guide rails 67 and 68 are disposed within a guard rail 69, to which they are bolted. The guard rail 69 is bolted to a wall 70 of the machine frame. Each gripper carriage 59 contains a pin 71, which has a head that is embraced by a lug 72 of the chain 53. This lug is extended toward the gripper carriage and has a forked free end. This arrangement results in a positive driving connection between the gripper carriage 59 or the gripper 51 and the associated chain 53. Similarly, each gripper carriage 60 is driven by the chain 54 by means of its extended, forked lug 73, the free end of which is fitted onto a corresponding pin 74 of the gripper carriage 60. For an adaptation to tube sections of different width, this arangement enables a simultaneous change of the distance between the two grippers 51, 52 of all pairs of grippers at the same time by a relative movement between chains 53 and 54.

As all grippers are identical, their further design will be explained with reference to gripper 51, which is shown in section in FIG. 9. The gripper 51 comprises a fixed base 75, which is integral with the carriage 59. This base 75 carries a fixed front stop plate 76. The gripper 51 comprises further a movable top part 77, which is mounted by means of a guide ring 78 in the carriage 59 for a longitudinal sliding movement and is forked at its free end. A cam follower 78 is disposed between the two limbs of the fork and rotatably mounted on a pin 79. The cam follower 78 cooperates with cam rails 80 and 88 (see also FIG. 1). Each of said rails has an upgrade portion 86 and a downgrade portion 87 and is bolted to the wall 70 of the machine frame. A pin 81 is non-rotatably inserted in a longitudinal bore of the top part 77 and at its free end is guided by a guide ring 82 for longitudinal sliding movement in the carriage 59. The pin 81 has a gripping lug 84, which defines a machined recess 83 and cooperates with the stop plate 76. The base 75 of the gripper holds a spring 85, which is stressed between the end face of the top part 77 and the guide ring 82.

Figure 8:
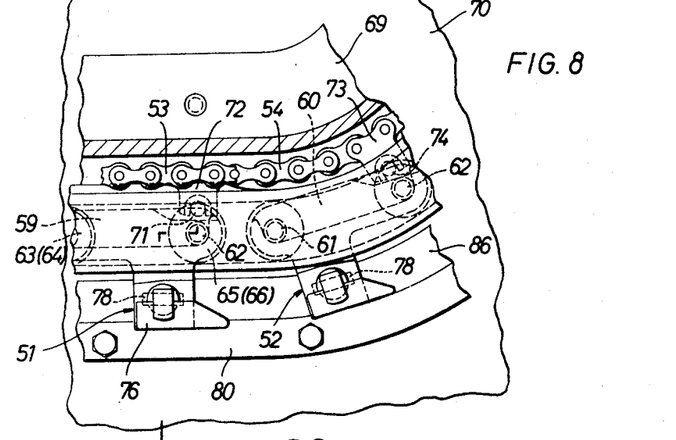
FIG. 8 is an elevation, partly in a section taken on line VIII—VIII of FIG. 9, and shows the grippers and their guiding means on a larger scale than in FIGS. 1 to 3.

FIGS. 8 and 9 show the gripper 51 in its closed position, in which the pressure of the spring 85 urges the gripping lug 84 against the stop plate 76 so that the top edge portion of the ply 29 of a tube section end portion is held between parts 84 and 76. When the gripper 52 is in the position shown in FIG. 8, its cam follower 78 has run up on the upgrade portion 86 of the cam rail 80 so that the pin 81 of the top part 77 of this gripper is urged outwardly and the spring 85 is compressed. As a result, the gripping lug 84 is lifted from the stop plate 76 and releases the ply 29 of the tube section 8. The same movement is subsequently performed by the gripper 51. To avoid an unnecessary stressing of the spring 85 of each of grippers 51, 52, the cam follower 78 of these grippers moves subsequently along the downgrade portion 87 of the cam rail 80 so that the spring 85 is relaxed and the grippers are held in their closed position as they continue their revolution, until they run up on the upgrade portion 86 of the cam rail 88 (FIG. 1) and are thus opened as described and subsequently closed to grip the top edge portion of a ply 29 of the tube section while the gripper rolls along the downgrade portion 87. The outer edge of the gripping lug 84 holds the inside edge of the corner tucks 47 and 48 in position.

When the top edge of the upright perpendicular ply 29 of a tube section end portion has been gripped by a pair of grippers 51, 52 and the ply 29 is thus held in its perpendicular position as the advance of the tube section 8 is continued, one slider 89 for forming corner tucks is moved vertically from above into the opened end of the tube section so that the corner tucks 47 and 48, which were preformed when the tube section 8 was in position II, are given exactly the shape of a right-angled, isosceles triangle.

As is apparent from FIG. 2, four sliders 89 for forming corner tucks are provided. For the sake of clarity, only one of said sliders is shown in FIG. 1. Each slider 89 for forming corner tucks is guided by a carraige 106 on a guide rail 113 and is driven by its carriage 106 from a chain 90, which revolves continuously about sprockets 91 and 92 disposed in a horizontal plane. For the sake of clearness, the chain 90 and its sprockets 91 and 92 are omitted in FIG. 1. The chain 90 revolves at the same speed as the tube sections 8. The distance between two adjacent sliders 89 for forming corner tucks is as large as the distance between the grippers 51 and 52 of two adjacent pairs of grippers (see FIG. 1) so that each slider 89 cooperates with a pair of grippers 51, 52. Where six pairs of grippers 51, 52 are provided, only four sliders 89 for forming corner tucks are required because the orbit of the sliders for forming the corner tucks may be shorter than the orbit of the pairs of grippers. To ensure that the sliders 89 for forming the corner tucks can be perpendicularly moved into the opened ends of the tube sections 8 while the latter are moving, the sliders are moved at least temporarily along a path which is inclined from the horizontal. In the embodiment shown in FIGS. 1 and 2, this path is defined by a guide rail 93, and each slider 89 carries a cam follower 94 rolling along this rail.

Figure 12:
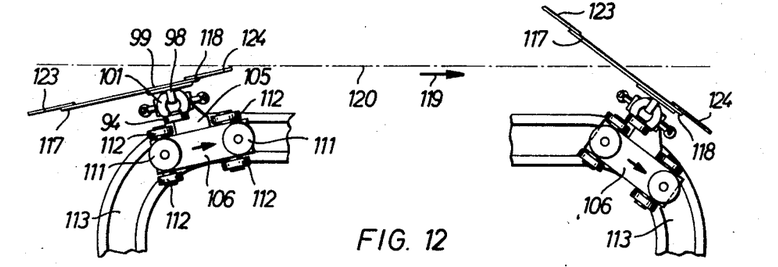
FIG. 12 is a top plan view showing a slider for forming corner tucks in different positions on its orbit and on a smaller scale than in FIGS. 10 and 11.

As the sliders 89 are identical in design, their structure and mode of operation will be explained with reference to the slider 89, which is shown in different positions in FIGS. 10 to 12. The cam follower 94 of the slider is rotatably mounted on a pin 95, which is inserted in a guide rod 96. The rod 96 is formed with a longitudinal groove 97, in which a spline 98 is firmly fitted. A plate 151 is secured to the lower end of the spline 98. A spreading member 99 having two spreading arms 117 and 118 is bolted to the plate 151. When sacks of a different size are to be manufactured, this readily detachable connection facilitates the replacement of a spreading member 99 by another spreading member which is in accordance with the desired width of the tube section. The guide bar 96 and its spline 98 are displaceable in a guide sleeve 101 in the direction of the double-headed arrow 100. The spline is slidable in a longitudinal slot of the guide sleeve 101. Two return springs 102 extend between a pinlike spring abutment 103 at the top end of the guide sleeve 101 and a pinlike spring abutment 104 at the lower end of the guidebar 96. A connecting member 105 connects the guide sleeve 101 to the carriage 106, which is guided with very high precision in horizontal and vertical directions with respect to its horizontal center plane by horizontal guide rollers 111, which are rotatably mounted on axles 107 and 108, and by vertical guide rollers 112, which are rotatably mounted on axles 109 and 110. The rollers 111 and 112 roll along the guide rail 113, which consists of two one-half sections. The chain 90 comprises a sleeve 114, which contains a pin 115. This pin is nonrotatably secured in a central bore of an extension 116 of the axle 108 to establish a positive driving connection between the chain 90 and the slider carriage 106.

Figures 10, 11:
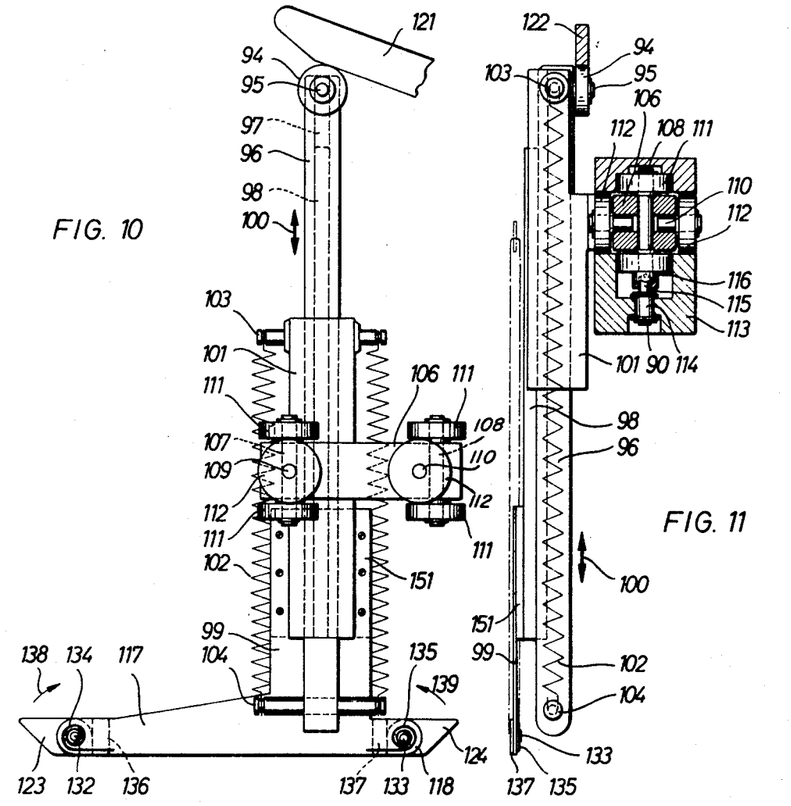
FIG. 10 is an elevation showing a slider for forming corner tucks in a view similar to FIG. 1 but in a different position and on a larger scale.
FIG. 11 is a sectional view taken on line XI—XI in FIG. 1 and shows a slider for forming corner tucks on a larger scale than in FIG. 1.

In the position shown in FIG. 10, the slider 89 is at the run-up end of an inclined portion 121 of the guide rail 93. As this slider is guided downwardly along the inclined portion 121 by its cam follower 94, the slider enters the open end of a tube section 8, which is continuously moved through the apparatus. The pressure which is thus applied to the guide bar 96 causes the same to slide downwardly in the guide sleeve 101 while the return spings 102 are being extended. The spreading member 99 secured to this bar 96 follows the movement of the latter. FIG. 12 shows in the left-hand half a slider 89 during its pivotal movement into the opened end portion of a tube section. To avoid during this operation damage to the tubing by an impact of the slider on the upright perpendicular ply 29, which moves along line 120 in the direction of arrow 119, the leading spreading arm 118 is shorter than the trailing spreading arm 117 of the slider.

As long as the cam follower 94 rolls along a horizontal portion 122 of the guide rail 93, the respective slider 89 is in its lowermost position within the open end portion of the tube section (see position III of the tube section 8 in FIG. 1 and the position of the slider shown in FIG. 11). The tips 123 and 124 of the spreading arms 117 and 118 are then disposed at the lower corners of the corner tucks 47 and 48 so that these tucks are tightly spread and exactly aligned.

As the slider 89 under consideration continues to roll along the horizontal portion 122 of the guide rail 93, the slider 89 and the tube section end, which has now been unfolded to an open crossed bottom, reaches a spot-welding device, by which the corner tucks 47 and 48 are fixed in position by being welded to the plies 29 and 31 of the open crossed bottom. The spot-welding device comprises two rollers 124 and 125, which are secured to a shaft 123. Each of the rollers 124 and 125 carries two heated spikes 126 and 127. The shaft 123 rotates in the direction of the arrow 128 in FIG. 1. During the rotation of the shaft 123, the spikes 126, 127 pierce the corner tucks 47, 48 and the plies 29 and 31 to join the same by spot welds 128, which are apparent from the showing of the tube section 8 in position IV.

Before tube section 8 assumes position IV, its end portion which has been unfolded to an open crossed bottom passes between two pairs of rollers 129, 130, which are vertically aligned and compress the spot welds 128 while they are still warm. In this way, the welded joints are strengtened.

The cam follower 94 of the slider 89 rolls thereafter along another inclined portion 131 (FIG. 1) of the guide rail 93 so that the slider is moved out of the open crossed bottom. To enable a movement of the tips 123 and 124 of the spreading arms 117 and 118 from the corner tucks without damage to the latter, these tips are nonrotatably mounted on pins 132 and 133 (FIG. 10) and these pins are rotatably mounted in the spreading arms. Each of the pins 132, 133 is surrounded by a spiral spring 134 or 135, which is secured at one end to its pin 132 or 133 and at its other end to the respective spreading arm 117 or 118. When the oblique outer end of the tips 123, 124 of the spreading arms cooperates with the respective corner tuck 47, 48, the inner end, which has a rounded top, lies with its lower portion against a stop member 136 or 137. When the cam roller 94 of the slider rolls along the inclined portion 131 of the guide rail 93, the guide bar 96 and its spreading member 99 are further depressed by the pressure applied to said bar. As the oblique ends of the tips 123, 124 of the spreading arms are then supported in the corners of the corner tucks, the tips 123, 124 are pivotally moved in an upward direction in the direction of arrows 138, 139 (FIG. 10) while the rotation of the pins 132, 133 stresses the spiral springs 134, 135. This pivotal movement is limited by the stop members 136, 137. Without damaging the lower corners of the corner tucks, the slider 89 is thus swung out of the open crossed bottom. As soon as the slider has left the corner tucks, the spiral springs 134, 135 relax to return the tips 123, 124 of the spreading arms to their initial position, shown in FIG. 10.

When the slider has been swung out of the open crossed bottom, the cam follower 94 of the slider rolls along another horizontal portion 140 of the guide rail 93. As is apparent from FIG. 2, the portion 140 terminates in an arc which is concentric with the guide rail 113. This last phase of the cycle of operation of the slider 89 is shown in the right-hand half of FIG. 12. During this phase, the trailing, long spreading arm 117 cannot damage the open crossed bottom, which is till moving in the direction of arrow 119 along line 120, because at this time the spreading arms 117 and 118 are below the depending perpendicular ply 31 of the open crossed bottom.

As soon as the slider 89 which has been considered rolls from the horizontal run-out portion 140 of the guide rail 93, the guide bar 96 is relieved from pressure so that the return spring 102 is relaxed and pulls the guide bar 96 and the spreading member 99 to the initial position, shown in FIG. 10. A new cycle of operation begins when the cam follower 94 of the respective slider 89 runs up again during its further revolution on the inclined portion 121 of the guide rail 93.

When the grippers 51, 52 have released in the manner described the open crossed bottom formed by the end portion of the tube section in position IV, the tube section 8 is laid by means not shown into a horizontal position, in which the crossed bottom is completed in known manner by folding operations.

Figure 3:
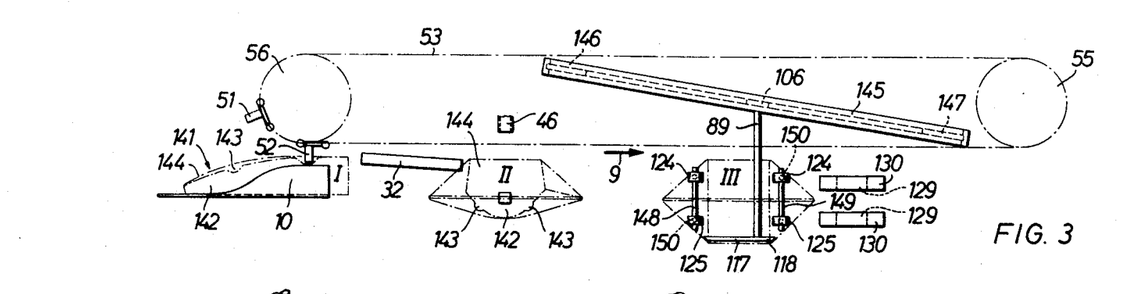
FIG. 3 is a view similar to that of FIG. 1 and showing another embodiment of the invention.

FIG. 3 is a diagrammatic view showing two further embodiments of apparatus according to the invention. In FIG. 3, only the elements which are essential for the invention are shown. Elements which have been described hereinbefore are provided with the same reference characters and will not be described once more. The unfolding apparatus according to FIG. 3 is used for processing tube sections 141, in which one ply 142 has been formed in a preceding operation with two indentations 143, which are spaced by a distance equal to the distance between the two grippers 51, 52 of a pair. The gripping lug 84 of the two grippers 51, 52 of each pair can extend through the indentations 143 so that the grippers grip only the other ply. Only one pair of grippers are shown in FIG. 3. The grippers grip the ply 144 as soon as the plate 10 has raised the end portion of the tube section 141 to a perpendicular position. For this reason, the sprocket 56 is disposed adjacent to the plate 10 and the chain 53 as well as the guide rails for the gripper carriages are correspondingly increased in length. These guide rails are not shown in FIG. 3. In the embodiment shown in FIG. 3, the pairs of grippers 51, 52 perform the function of both the vacuum box 11 and the vacuum conveyor belt 12 in the first embodiment of the invention and retain the ply 144 in its perpendicular position throughout the processing operation whereas the vacuum beam 32 pulls the ply 142 from the ply 144 and the air jet discharged by the pipe 46 and, if desired, the opening rod 49 are used to move the ply 142 further downwardly, as has been described hereinbefore.

When relatively heavy and strong plastics material sheeting is to be processed, it is not necessary to control the sliders 89 for forming corner tucks as exactly as is desirable for very thin sheeting with the aid of the guide rail 93 having alternating inclined and horizontal portions. In this case it will be sufficient to provide for an inclination of the entire guide rail for the slider carriages 106 relative to the horizontal so that each of the continuously revolving sliders 89 can move vertically downwardly into an open end of a tube section. Such a guide rail is shown in FIG. 3 at 145. The chain for driving the slider carriages 106 extends around sprockets 146 and 147 having a corresponding inclination. In this embodiment there is no guide rail engaged by a cam follower of the slider and the latter may be simplified because the guide bar 96 need not be guided in a guide sleeve 101 and there is no need for a return spring 102 for returning the guide bar 96 and its spreading member 99 to their initial position when the cycle of operation has been completed. The guide rod 96 may now be firmly connected to the slider carriage 106. The design of the spreading member 99 is not changed and the elimination of the guide rail 93 and the performance of its function by the inclined guide rail 145 do not involve a basic change in the mode of operation of the sliders 89.

In the embodiment shown in FIG. 3, the sliders 89 perform a constant downward movement while they engage in the corner tucks. On the other hand, the corner tucks of the open crossed bottom must be fixed in position when the tips of the spreading arms 117 and 118 of the respective slider 89 are at the lower corners of the corner tucks, and the spreading and exact aligning of the corner tucks are effected at this time. For this reason, two spot-welding devices 148 and 149 are provided, which differ from the spot-welding device described with reference to the first embodiment of the invention in that each of their rollers 124 and 125 carries only one heated spike 150. By means which are not shown, the spot-welding devices 148 and 149 are controlled in such a manner that the welding and fixing of the two corner tucks to the portions 142 and 144 of the open crossed bottom is effected in the manner described hereinbefore and at the above-mentioned time, in which the slider 89 in FIG. 3 is at the tube section shown in position III. For adjustment to tube sections of different widths, the distance between the two spot-welding devices 148 and 149 can be varied because they are mounted by means not shown so as to be displaceable in and opposite to the direction of travel of the tube sections 141. When the open crossed bottoms have passed between the pairs of pressure rollers 129, the tube sections 141 are further processed as has been described with reference to the tube sections 8.

I claim:
1. In an apparatus for manufacturing block bottom bags of plastic sheet material, an apparatus for opening the ends of plastic tube sections comprising two superposed plies, said apparatus comprising:
  (a) continuously revolving conveyor means for moving said tube sections along a horizontal path of travel through said apparatus in a direction transverse to their longitudinal axes;
  (b) means located at the receiving end of said apparatus for bending the end portions of the tube sections to be opened through 90° to a vertical position;
  (c) means to hold one of said plies of each tube section in the vertical position, said holding means comprising a plurality of gripper means spaced in pairs on endless first transport means, wherein each pair of said gripper means is adapted to grip and take hold of the upper edge of said one ply adjacent to the hypotenuses of the corner flaps to be formed subsequently on opening said tube sections;
  (d) suction means to withdraw the other one of said plies from said one ply held in the vertical position and turn the former through substantially 180°, so as to open said end portion of each tube section under formation of two opposing corner flaps;
  (e) a plurality of sliding means arranged on endless second transport means and adapted to slide into the opened ends of said tube sections, each of said sliding means comprising two opposing spreading arms extending horizontally, and each of said arms having an oblique free edge adapted to engage the relevant corner flap of said two corner flaps adjacent to the hypotenuse thereof at the lower edge of said other ply, so as to straighten said corner flaps; and
  (f) means to weld said straightened corner flaps to said two plies held in vertical positions.

2. An apparatus according to claim 1 and further comprising a vacuum box and a vacuum conveyor belt which is moved over said vacuum box.

3. An apparatus according to claim 2, characterized in that the vacuum box is divided into at least two compartments, a common vacuum pump is provided for all compartments of the vacuum box, and vacuum conduits provided with separately controlled shut-off valves extend from said vacuum pump to the various compartments of the vacuum box.

4. An apparatus according to claim 2, characterized in that the rows of vacuum openings in these are provided vacuum conveyor belts which cooperate with vacuum slots of the vacuum box and are spaced apart by a distance which is at least as large as the length of a vacuum slot in the vacuum box.

5. An apparatus according to claim 2, characterized in that the length of a row of vacuum openings in the vacuum conveyor belt is at most as large as the width of the narrowest tube section to be handled in the apparatus.

6. An apparatus according to claim 2, characterized in that the grippers succeed the vacuum conveyor.

7. An apparatus according to claim 1, characterized in that the grippers become effective at the receiving end of the unfolding station and the movable part of each gripper extends through an indentation of the tube section ply to be pulled off, said indentations being spaced apart by a distance which is as large as the distance between the grippers.

8. An apparatus according to claim 1, characterized in that the device for pulling one ply from the other ply, which is retained in position, comprises a vacuum beam which performs one revolution per cycle of the machine and is moved parallel to the direction of travel of the sack blanks.

9. An apparatus according to claim 8, characterized in that the orbit of the vacuum beam is inclined relative to the horizontal.

10. An apparatus according to claim 9, characterized in that the vacuum openings of the vacuum beam are arranged in a row which has, relative to the vacuum beam, an inclination that is equal and opposite to the inclination of the vacuum beam from the horizontal.

11. An apparatus according to claim 8, characterized in that a transmission having a cyclically changing ratio is used for a periodic change of the velocity of the vacuum beam during its revolution.

12. An apparatus according to claim 1, characterized in that a blowing tube is provided which extends at right angles to the plane in which the tube sections are moved and directs an air stream into the preopened tube section end portion when one ply of the tube section has been pulled from the other ply which is retained in position.

13. An apparatus according to claim 1, characterized in that an opening rod is provided which wipes downwardly the ply that has been pulled from the retained ply.

14. An apparatus according to claim 1, characterized in that the two grippers of each pair are held in their closed position by the pressure of a spring, whereas the pair can be opened as a result of a rolling movement of a roller carried by the movable part of each gripper on an upgrade portion of a cam rail so that the movable gripper part is forced outwardly against the spring pressure.

15. An apparatus according to claim 1, characterized in that separate chains are provided for the leading and trailing grippers, respectively, of all pairs of grippers.

16. An apparatus according to claim 1, characterized in that the sliders for forming the corner tucks are moved along a path which is inclined from the horizontal.

17. An apparatus according to claim 16, characterized in that the guide path is defined by a guide rail and each slider is provided with a roller that rolls along said guide rail.

18. An apparatus according to claim 16, characterized in that the guide rails for the carriages, which carry the sliders, are inclined from the horizontal and that simultaneously acting welding devices for all four corner tucks are provided.

19. An apparatus according to claim 1, characterized in that the carriages for the sliders are guided by rollers and a guide rail in horizontal and vertical directions.

20. An apparatus according to claim 1, characterized in that the leading spreading arm of the sliders for forming the corner tucks is shorter than the trailing spreading arm.

21. An apparatus according to claim 1, characterized in that those ends of the spreading arms which extend into the corner tucks and carry the oblique edges that cooperate with the folds of the corner tucks, are resiliently mounted to swing upwardly under pressure and the slider can slide downwardly from the unfolded crossed bottom.

22. An apparatus according to claim 1, characterized in that the spreading member of each slider for forming the corner tucks is easily detachably connected to the guide bar of the slider and is replaceable by spreading members having a different length.

References Cited

UNITED STATES PATENTS

| | | | |
|---|---|---|---|
| 2,641,167 | 6/1953 | Gramegna | 93—22 |
| 2,888,859 | 6/1959 | Dambacher | 93—28 |
| 3,056,338 | 10/1962 | Lovett et al. | 93—53 |
| 3,326,094 | 6/1967 | Camerini | 93—28 |

BERNARD STICKNEY, Primary Examiner

U.S. Cl. X.R.

93—22